United States Patent
Gogulapati (10) Patent No.: US 7,701,616 B2
(45) Date of Patent: Apr. 20, 2010

(54) SYSTEMS, METHODS, AND USER-INTERFACES FOR SECURE DOCUMENT SCANNING

(75) Inventor: Madhu Gogulapati, Mountain View, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 873 days.

(21) Appl. No.: 11/540,003

(22) Filed: Sep. 29, 2006

(65) Prior Publication Data
US 2008/0080022 A1  Apr. 3, 2008

(51) Int. Cl.
*H04N 1/40* (2006.01)
*H04N 1/04* (2006.01)
*G06F 3/00* (2006.01)

(52) U.S. Cl. ............... 358/3.28; 358/449; 358/444; 358/448; 715/716

(58) Field of Classification Search ........... 358/452, 358/448, 505, 449, 404, 444, 1.16, 474, 3.28; 382/298, 305, 162, 309, 312; 715/719, 728, 715/716, 705
See application file for complete search history.

(56) References Cited

U.S. PATENT DOCUMENTS

2004/0207885 A1* 10/2004 Jackson et al. ............. 358/453
2004/0212700 A1* 10/2004 Prabhu et al. ............ 348/231.99
2008/0025642 A1* 1/2008 Kim ............................ 382/298
2009/0018814 A1* 1/2009 Nieuwlands .................. 703/24

FOREIGN PATENT DOCUMENTS

JP      02006086919      *  3/2006

* cited by examiner

*Primary Examiner*—Jerome Grant, II
(74) *Attorney, Agent, or Firm*—Finnegan, Henderson, Farabow, Garrett & Dunner, LLP (57) ABSTRACT

Systems, methods, and user-interfaces consistent with embodiments of the present invention provide for a method for secure document scanning in a non-private environment. In some methods for secure document scanning in a non-private environment, the presence of an accessible and writeable removable media device coupled to a scanning device may be detected and the user may be presented with interfaces to configure parameters related to the scan, including scanning device related parameters, document related parameters, and removable media device related parameters. The scanned document may be saved to the removable media device if it meets criteria specified by the user, which may include verification and authentication of security mechanisms embedded in the document.

20 Claims, 5 Drawing Sheets

SYSTEMS, METHODS, AND USER-INTERFACES FOR SECURE DOCUMENT SCANNING

BACKGROUND

1. Field of the Invention

The present invention relates to the field of document scanning and in particular, to systems, methods, and user-interfaces for securely scanning documents in a public or non-private environment.

2. Description of Related Art

Computer scanners such as document scanners, printers, and multi-function devices facilitate the conversion of physical documents into electronic form and vice-versa. For example, a physical document may be scanned and stored in electronic form on a computer. The scanned document may be represented, at least initially, as an image comprising of a sequence of pixels. A user may often configure the scanner prior to a scan by selecting from various scan or document-related options such as document size, format of the output file, and/or scan resolution. Typically, the scanned image is transmitted over a network or to an attached computer and may be saved at a default or user-specified location.

In a home or another controlled private or secured environment both network transmission and image storage may be relatively safe and users may be able to prevent access to private files. However, in an office, public, or semi-public, or any non-private environment both network transmission and storage of scanned files may raise security risks. Information sent over a network may be intercepted and images stored in default publicly accessible folders may be viewed by unauthorized parties before they can be deleted. For example, users in a public document service center (such as Kinko's) may be loathe to scan personal or private information without assurances regarding the confidentiality of the scanned data.

Thus, there is a need for systems, methods, and user-interfaces to allow users to scan documents securely and effect greater control over the scanning process.

SUMMARY

In accordance with the present invention, systems, methods, and user-interfaces for secure document scanning in a non-private environment are presented.

In some embodiments, a method for secure document scanning in a non-private environment comprises detecting the presence of a removable media device connected to a scanning device; providing a user-interface to allow users to set configuration parameters, wherein the configuration parameters include scanning device configuration parameters, document related configuration parameters, and removable media device related parameters; and storing the scanned document to the removable media device based on criteria specified by the user. Criteria specified by the user may include one or more of direct storage of the scanned document; detecting and validating digital watermarks and other embedded document security schemes; and filenames, including specification of directory, folder, or path information on the removable media drive.

Detecting the presence of a removable media device connected to the scanner may comprise reporting an error, if the scanning device does not include a functional removable media port; reporting the presence of an accessible writeable removable media device, if an accessible writeable removable media device is connected to the removable media port; and prompting the user to attach a writeable removable media device to the removable media port, if no accessible writeable removable media device has been connected to the port. Removable media devices may comprise one of flash drives, USB flash drives, compressed flash drives, secure flash drives, compressed and secure flash drives, microdrives, and pocket hard drives.

Scanning device configuration parameters may comprise one or more of scan resolution, paper size, paper tray, automatic document feed, color options, monochrome options, scanned image format, optical character recognition for document text, and number of pages to be scanned. Document related configuration parameters may comprise one or more of detecting digital watermarks or other embedded document security features, and validating any detected digital watermarks or other embedded document security features. Removable media device parameters may comprise one or more of compression related parameters, decryption keys for reading the file system on the removable media device, passwords to access the removable media device, and bio-metric identifiers to access the removable media device.

In some embodiments, the user-interface to allow users to set scan-configuration parameters may be displayed on the scanning device or on a a console coupled to the scanning device.

Embodiments of the invention also relate to processors executing instructions for secure scanning and to instructions for secure scanning stored on compute-readable media and computer memory.

These and other embodiments are further explained below with respect to the following figures.

DETAILED DESCRIPTION

In accordance with the present invention, systems and methods for secure document scanning are presented.

Figure 1:
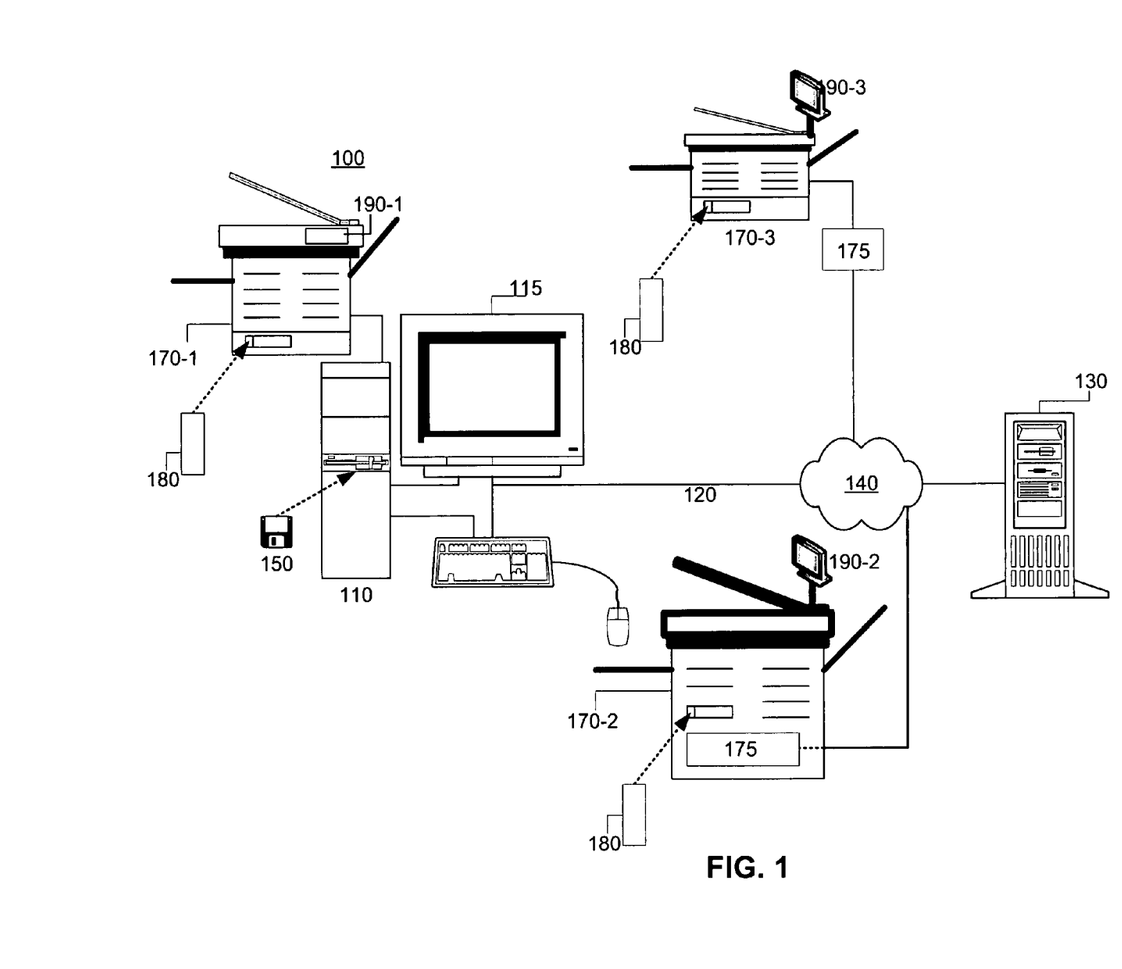
FIG. 1 shows a block diagram of an exemplary system for secure document scanning.

FIG. 1 shows a block diagram of an exemplary system for the secure scanning of documents. A computer software application consistent with the present invention may be deployed on a network of computers, scanners, multi-function devices, and other peripherals as shown in FIG. 1, that are connected through communication links that allow information to be exchanged using conventional communication protocols and/or data port interfaces. In some instances, system 100 may be deployed in a non-private environment from a user-standpoint. For example, the non-private environment may comprise an office, public, or semi-public environment, where other users may potentially be able to view, intercept, or otherwise gain access to a user's private data.

As shown in FIG.1, exemplary system 100 includes a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110, scanning devices 170, and other devices too (not shown). Computing device 110 and server 120 may be capable of executing software (not shown) that allows the control and configuration of scanning devices 170, such as exemplary scanning devices 170-1, 170-2, and 170-3. Exemplary scanning devices 170-1, 170-2, and 170-3 may be scanners, or multi-function devices, or other devices that are capable of scanning or digitizing documents.

Computing device 110 also contains removable storage drive 150. Removable storage drive 150 may include, for example, 3.5 inch floppy drives, CD-ROM drives, DVD ROM drives, CD±RW or DVD±RW drives, and/or any other removable storage drives consistent with embodiments of the present invention. In some embodiments, portions of the software application may reside on removable media and be read and executed by computing device 110 using removable storage drive 150.

Connection 120 couples computing device 110, server 130, and scanning device 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as Ethernet, USB, SCSI, and/or FIREWIRE, ports for transmission of data through the appropriate connection 120. The communication links could be wireless links or wired links or any combination consistent with embodiments of the present invention that allows communication between computing device 110, server 130, and scanning devices 170.

Network 140 could include a Local Area Network (LAN), a Wide Area Network (WAN), or the Internet. In some embodiments, information sent over network 140 may be encrypted to ensure the security of the data being transmitted.

As shown in FIG. 1, system 100 may include multiple scanning devices. Scanning devices 170 may be connected to network 140 through connection 120. In some embodiments, scanning device 170 may also be connected directly to computing device 110 and/or server 120 and controlled by software running on computing device 110 or server 120. In general, scanning devices 170 may be controlled by one or more of a combination of software, hardware, or firmware. Scanning devices 170 may be controlled using integrated or external controllers 175. For example, scanner 170-2 can be controlled by integrated controller 175, while scanner 170-3 can be controlled by external controller 175.

Configuration parameters pertaining to exemplary scanning devices 170 may be user-configurable. For example, scanning device configuration parameters such as the resolution, image formats, document sizes, color encoding, and other configuration parameters may be user-configurable. A user may also be able to specify input trays and the use of automatic document feeders to allow batch processing of documents. In general, the nature and type of configuration options will depend on the function of the scanning device and the features available on a specific device. In some embodiments, information transferred to and/or from the scanning device may be transferred to and stored on computing device 110, server 130, and/or removable media devices 180. Users may also be able to log into a scanning device 170 to perform administrative functions such as to enable software or firmware on printing device 160 to perform various functions. In some embodiments, the log in process may require a password or other user-authentication mechanism.

In some embodiments, the user may also be able to configure the scanner with other document related configuration parameters. Document related configuration parameters may comprise one or more of detecting digital watermarks or other embedded document security features, and validating any detected digital watermarks or other embedded document security features when a document is scanned.

Scanning devices 170 may also have ports for the connection of removable media devices 180, such as flash drives, USB drives, secure drives, pocket hard drives, microdrives, or other storage devices, as shown in FIG. 1. In some embodiments, files, results, or reports generated by an application executing on scanning devices 170 may be stored on removable media device 180. In some embodiments, removable media drives 180 may also be connected to ports (not shown) on computing device 110, or an external controller 175 using secure links. For example, when computing device 110 serves as a controller for scanning device 170-1, removable media drive 180 may be connected to an appropriate port (not shown) on computing device 110. In some embodiments, the use of removable media device ports (not shown) on computing device 110 and/or external controller 175 may also allow the use of methods and techniques described herein with scanning devices 170 that may not be equipped with such ports, or in situations where the removable media device ports on scanning devices 170 are not easily accessible, or non-functional.

In some embodiments, secure flash drives may feature encryption of the stored data using full disk encryption below the file system. Such encryption can prevent unauthorized persons from accessing the stored data. In some embodiments, encryption applications (such as TrueCrypt, Crypto-Buddy, and PrivateDisk) can be stored on the removable media drive, together with the encrypted file image. The encrypted partition can then be accessed on any computer or device capable of running the encryption application. For example, executable files for Windows, Macintosh, and Linux may be included on the drive. In some embodiments, flash drives may support biometric fingerprinting to confirm the user's identity and provide an even higher level of security.

Scanning devices, such as exemplary scanning devices 170-1, 170-2, and 170-3, may also include consoles 190 such as exemplary consoles 190-1, 190-2, or 190-3, and other interfaces to allow graphical user interfaces to be displayed, configuration options to be set, and other communication and interaction with users. In some embodiments, interaction with scanning devices 170 may occur through user-interfaces displayed on a monitor for a computer coupled to scanning devices 170. For example, user interfaces to set one or more configuration options on scanning device 170-1 may be displayed on monitor 115, which is coupled to computer 110. A user interface pertaining to scanner 170-3 may also be displayed on monitor 115, using software running on server 130.

A computer software application consistent with the present invention may be deployed on one or more of the exemplary computers, scanners, and/or other peripherals. For example, scanning device 170-1 could display user-interfaces on console 190-1 based on software executing on computing device 110 that may be downloaded from server 130. In some embodiments, scanning devices 170 may execute the entire computer software application. In general, interaction with users may occur through appropriate user-interfaces using exemplary consoles 190. User interaction may also occur through appropriate user-interfaces using controllers 175, server 130, computer 110 and appropriate user input and display devices.

Figure 2:
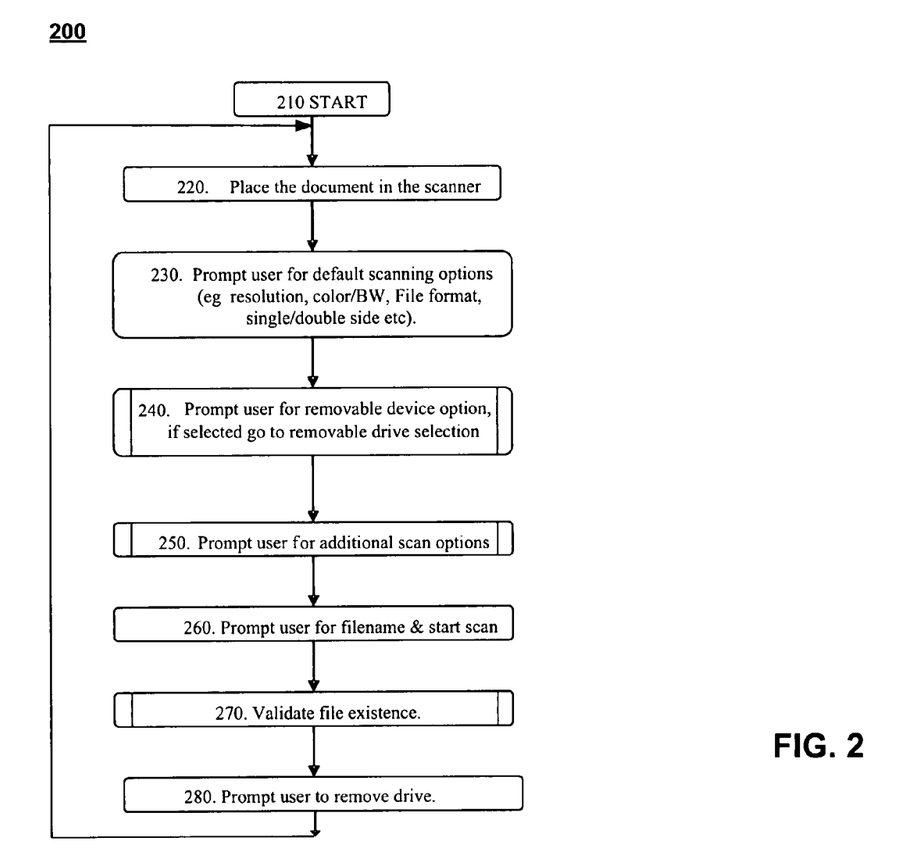
FIG. 2 depicts an exemplary flowchart of a method for the secure scanning of documents.

FIG. 2 depicts an exemplary flowchart of a method for the secure scanning of documents. Portions of an application implementing steps in flowchart 200 may be executed on one or more of computing device 110, server 130, controllers 175, and/or scanners 170. The algorithm commences in step 210. In step 220, the application may determine if a document is to be scanned. Scanning devices 170 may auto-detect documents presented for scanning or may receive user-input indicating that documents for scanning are present.

In step 230, the user may be presented with scanning device configuration options pertaining to the scan. For example, scan resolution, number of pages, scanned image format, automatic document feed, color and/or monochrome options, paper tray, paper size, optical character recognition (OCR) for text in documents, etc. may be specified through an appropriate user-interface, including graphical user interfaces (GUIs) presented to the user on consoles 190. If user-interaction occurs through a computer, such as exemplary computer 110, scanning devices connected to, or accessible from, computer 110 may be determined by inspecting a list of such devices.

Figure 3:
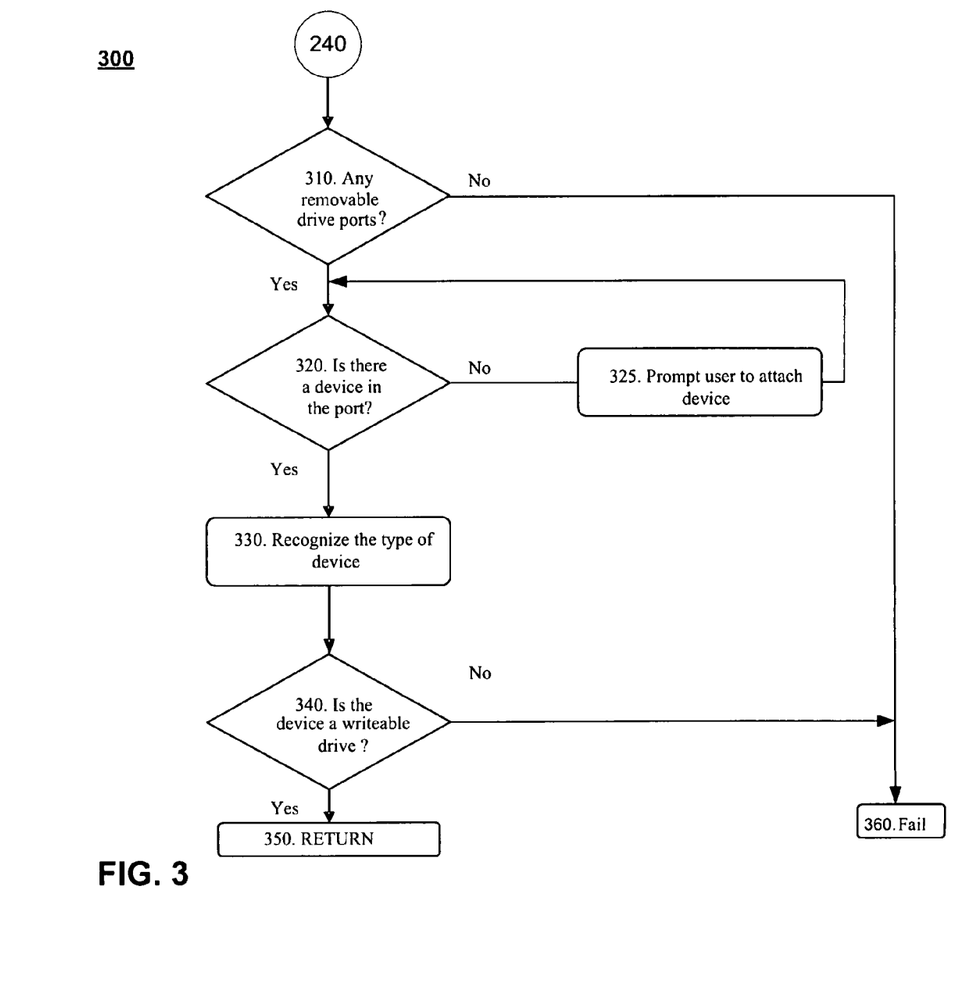
FIG. 3 depicts a flowchart detailing steps for detecting a removable media device coupled to a scanning device.

In routine 240, the user may be prompted for storage options for scanned documents. In some embodiments, storage options presented to the user may include storage on removable media devices 180. If no removable media device 180 is detected, then the user may be queried whether a removable media device 180 will be attached. If the user responds affirmatively, the user may be prompted to attach such a device. FIG. 3 depicts a flowchart detailing steps for detecting a removable media device coupled to a scanning device. In some embodiments, steps in flowchart 300 may form part of routine 240.

Figure 4:
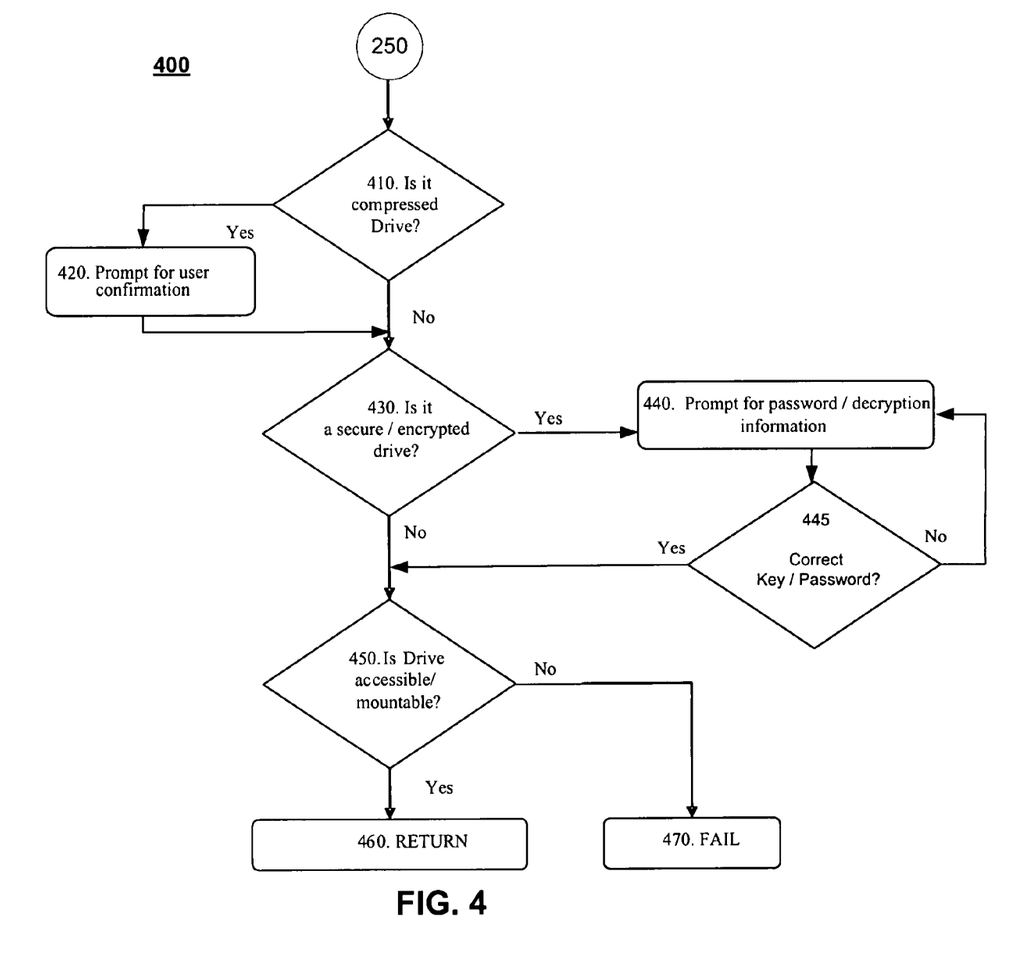
FIG. 4 shows a flowchart 400 with steps in a method for recognizing the type of removable media device coupled to scanning device 170.

In routine 250, the user may be prompted for additional scan options based on the nature of the storage media specified. For example, if removable media drive 180 is a secure drive, or requires a password, the user will be prompted appropriately. FIG. 4 shows a flowchart 400 with steps in a method for recognizing the type of removable media device coupled to scanning device 170. In some embodiments, steps in flowchart 400 may form part of routine 250.

Figure 5:
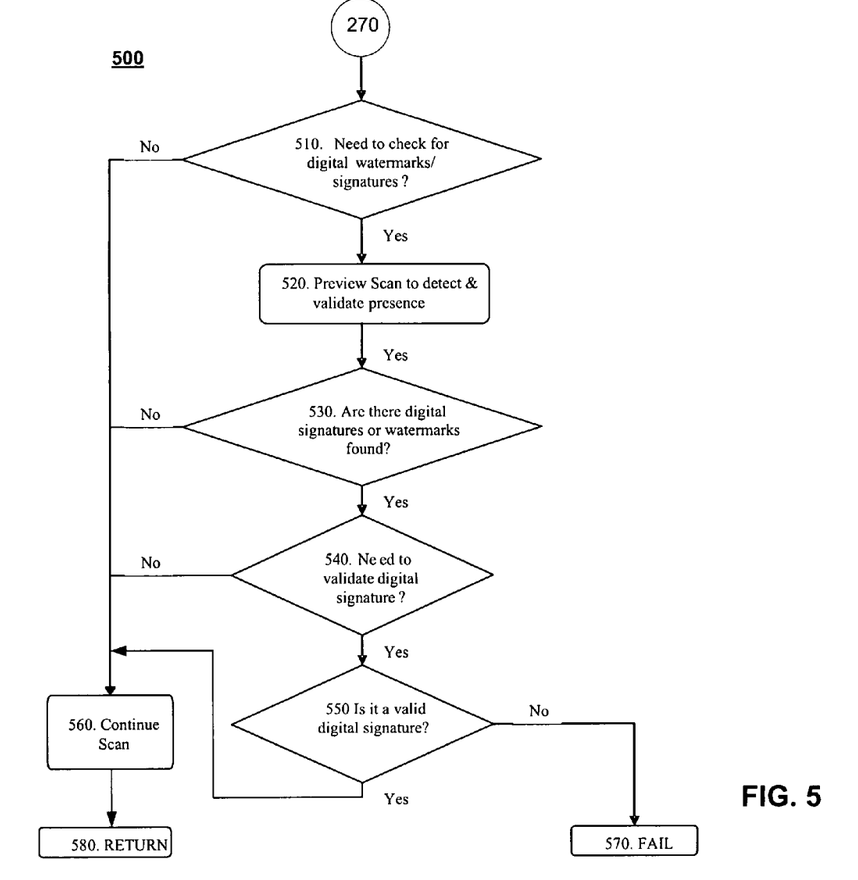
FIG. 5 shows a flowchart with steps in a method for input of additional scan options based on attributes associated with the scanned document.

In step 260, the user may be prompted for a file-name and the scan process may be started. After scanning the document it may be saved on the removable media device 180 in the location or directory specified by the user. In routine 270, the existence of the file may be verified. If the file exists, other attributes and aspects related to the scanned file may also be inspected and/or verified in routine 270. FIG. 5 shows a flowchart with steps in a method for input of additional scan options based on the attributes associated with a scanned document. In some embodiments, steps in flowchart 500 may form part of routine 270.

In step 280, the user may be prompted to remove removable media device 180. In some embodiments, the prompt may include an audible alarm, flashing lights, blinking icons, or other methods to alert user to remove removable media device 180. The algorithm may then return to step 220 to process the next document. The use of removable media device 180 directly attached to the scanning devices 170, or coupled to the scanner using a secure link, can prevent unauthorized access to the scanned file. Removable media device 180 may simply be removed by the user when the scan is complete preventing access to any stored data on the drive. Other features such as encryption or bio-metric identification present with secure drives may also help prevent unauthorized access to stored data on drives couples to scanning devices 170.

FIG. 3 depicts a flowchart 300 detailing steps for detecting a removable media device coupled to a scanning device. In some embodiments, the process depicted in flowchart 300 may be executed as a part of routine 240. In step 310, the algorithm checks whether scanning device 170 is configured with ports to accept removable media devices 180. If no such ports are present, or the port is unavailable then an appropriate error message or other corrective action may be taken in step 370.

If a port is present, the port may be queried to determine if a device is attached to the port in step 320. If no device is attached, then the user may be prompted to attach removable media device 180 in step 325. The algorithm then returns to step 320. In some embodiments, an error message or failure may be reported if no device is detected after a specified number of iterations and/or after a specified time period has elapsed.

If a device is present, the device is checked in step 330 to determine the type of device. In some embodiments, an auto-detect or plug and play feature in scanning device 170 may be invoked to automatically detect and recognize whether a device is connected to a port on scanner 170 and the type of device that has been connected. If the device is determined to be a writeable device in step 340, then control may be returned to the calling program in step 350. If the device is not writeable, an error routine may be invoked in step 360.

FIG. 4 shows a flowchart 400 with steps in a method for recognizing the type of removable media device coupled to scanning device 170. In some embodiments, the process depicted in flowchart 400 may be executed as a part of routine 240. In step 410, removable media device 180 is checked to determine if it is a compressed drive. If removable media device 180 is determined to be a compressed drive, the user may be asked to confirm this in step 420.

In step 430, removable media device 180 is checked to determine if it is a secure or encrypted drive. If removable media device 180 is determined to be a secure or encrypted drive, the user may be asked to input password and/or decryption information, such as a key, in step 440. The password or key is checked in step 445. If the information provided by the user is correct, then the algorithm proceeds to step 450. Otherwise, the user is returned to step 440 and asked to reenter the information. In some embodiments, an error message or failure may be reported after a specified number of iterations and/or after a specified time period has elapsed if an incorrect password or key is repeatedly entered.

Next, in step 450, the drive may be checked to determine whether it has been mounted and is accessible. If removable media device 180 is determined to be mounted and accessible, the algorithm returns control to the calling program in step 460. If the drive has not been mounted or is not accessible an error message may be displayed or an error-handling routine invoked in step 470. In general, a user may specify removable media device parameters using an appropriate user-interface displayed on a console 190 that pertain to access and storage of data on removable media devices 180. Removable media device parameters may comprise one or more of compression related parameters, decryption keys for reading the file system on the removable media device, passwords to access the removable media device, and/or biometric identifiers to access the removable media device. FIG. 5 shows a flowchart with steps in a method for input of additional scan options based on attributes associated with a scanned document. In some embodiments, the process depicted in flowchart 500 may be executed as a part of routine 270. In some situations, a document may be protected by a digital watermark or other security options to restrict the ability to scan the document or to allow only authentic scanned documents to be stored. A user may select from one or more options pertaining to scanned documents using menus or GUIs associated with additional scan options. In general, a user may specify several document related configuration parameters and configure the scanner to detect digital watermarks or other embedded document security features, and validate any detected digital watermarks or other embedded document security features.

In step 510, the user may be asked if the scanned document is to be checked for digital watermarks. If the user responds affirmatively, or selects the appropriate menu item, a preview scan may be performed to detect and confirm the presence of a digital watermark, or other security or authentication mechanism in step 520. In some embodiments, a preview scan may be a quick lower-resolution scan for the purposes of detecting digital watermarks embedded in a document. If no scanning for digital watermarks or other security mechanisms is to performed, then the algorithm may proceed to step 560, where the entire document may be scanned based on user settings and other scanner configuration settings.

If a digital watermark is found, then the user may be asked if the watermark or digital signature is to be validated in step 540. In step 550, the digital signature may be validated by invoking an appropriate application. If the signature is valid, the algorithm proceeds to step 560, where the entire document is scanned based on specified scanning device configuration parameters. If the signature is invalid, an error routine may be invoked in step 570. If no digital watermark or security mechanism is detected the algorithm may proceed to step 560, where the entire document may be scanned based on previously specified scanning device configuration parameters.

In general, the user may specify criteria to be met before a document is stored on removable media devices 180. The criteria specified by the user may include one or more of directly storing of the scanned document, storing the scanned document after detecting and validating digital watermarks and other embedded document security schemes. The user may also specify filenames for the scanned document, including directory, folder, and/or path information on the removable media drive for any stored documents. In some embodiments, the user may allow the scanning device to automatically generate unique filenames for the scanned files.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention also relate to compute-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method for secure document scanning in a non-private environment comprising:

detecting the presence of a removable media device coupled to a scanning device;

providing a user-interface to allow users to set configuration parameters, wherein the configuration parameters include scanning device configuration parameters, document related configuration parameters, and removable media device related parameters; and storing the scanned document to the removable media device based on criteria specified by the user.

2. The method of claim 1, wherein the removable media devices comprise one of flash drives, USB flash drives, compressed flash drives, secure flash drives, compressed and secure flash drives, microdrives, and pocket hard drives.

3. The method of claim 1, wherein the removable media devices are coupled to the scanning device using a secure or dedicated link.

4. The method of claim 1, wherein detecting the presence of a removable media device coupled to the scanner further comprises:

reporting an error, if the scanning device does not include a functional removable media port;

reporting the presence of an accessible writeable removable media device, if an accessible writeable removable media device is coupled to the removable media port; and prompting the user to couple a writeable removable media device to the removable media port, if no accessible writeable removable media device has been coupled to the port.

5. The method of claim 1, wherein scanning device configuration parameters further comprise one or more of:

scan resolution;

paper size;

paper tray;
automatic document feed;
color options;
monochrome options;
scanned image format;
optical character recognition for document text; and
number of pages to be scanned.

6. The method of claim 1, wherein document related configuration parameters further comprise one or more of:
   detecting digital watermarks or other embedded document security features; and
   validating any detected digital watermarks or other embedded document security features.

7. The method of claim 1, wherein removable media device parameters further comprise one or more of:
   compression related parameters;
   decryption keys for reading the file system on the removable media device;
   passwords to access the removable media device; and
   bio-metric identifiers to access the removable media device.

8. The method of claim 1, wherein the user-interface to allow users to set configuration parameters is displayed on the scanning device.

9. The method of claim 8, wherein the configuration parameters may be set on a console coupled to the scanning device.

10. The method of claim 1, wherein the criteria specified by the user may include one or more of:
    direct storage of the scanned document;
    detecting and validating digital watermarks and other embedded document security schemes; and
    filenames, including specification of directory, folder, or path information on the removable media drive.

11. A computer-readable medium that stores instructions, which when executed by a computer perform steps in a method for secure document scanning in a non-private environment, the steps comprising:
    detecting the presence of a removable media device coupled to a scanning device;
    providing a user-interface to allow users to set configuration parameters, wherein the configuration parameters include scanning device configuration parameters, document related configuration parameters, and removable media device related parameters; and
    storing the scanned document to the removable media device based on criteria specified by the user.

12. The method of claim 11, wherein the removable media devices comprise one of flash drives, USB flash drives, compressed flash drives, secure flash drives, compressed and secure flash drives, microdrives, and pocket hard drives.

13. The method of claim 11, wherein the removable media devices are coupled to the scanning device using a secure or dedicated link.

14. The method of claim 11, wherein detecting the presence of a removable media device connected to the scanner further comprises:
    reporting an error, if the scanning device does not include a functional removable media port;
    reporting the presence of an accessible writeable removable media device, if an accessible writeable removable media device is connected to the removable media port; and
    prompting the user to attach a writeable removable media device to the removable media port, if no accessible writeable removable media device has been connected to the port.

15. A computer readable memory containing instructions for controlling a computer system to perform steps in a method for secure document scanning in a non-private environment, the steps comprising:
    detecting the presence of a removable media device coupled to a scanning device;
    providing a user-interface to allow users to set configuration parameters, wherein the configuration parameters include scanning device configuration parameters, document related configuration parameters, and removable media device related parameters; and
    storing the scanned document to the removable media device based on criteria specified by the user.

16. The method of claim 15, wherein the removable media devices comprise one of flash drives, USB flash drives, compressed flash drives, secure flash drives, compressed and secure flash drives, microdrives, and pocket hard drives.

17. The method of claim 15, wherein the removable media devices are coupled to the scanning device using a secure or dedicated link.

18. The method of claim 15, wherein detecting the presence of a removable media device connected to the scanner further comprises:
    reporting an error, if the scanning device does not include a functional removable media port;
    reporting the presence of an accessible writeable removable media device, if an accessible writeable removable media device is connected to the removable media port; and
    prompting the user to attach a writeable removable media device to the removable media port, if no accessible writeable removable media device has been connected to the port.

19. A computer processor executing instructions that perform steps in a method for secure document scanning in a non-private environment, the steps comprising:
    detecting the presence of a removable media device coupled to a scanning device;
    providing a user-interface to allow users to set configuration parameters, wherein the configuration parameters include scanning device configuration parameters, document related configuration parameters, and removable media device related parameters; and
    storing the scanned document to the removable media device based on criteria specified by the user.

20. A system for secure document scanning in a non-private comprising:
    means for detecting the presence of a removable media device connected to a scanning device;
    means for providing a user-interface to allow users to set configuration parameters, wherein the configuration parameters include scanning device configuration parameters, document related configuration parameters, and removable media device related parameters; and
    means for storing the scanned document to the removable media device based on criteria specified by the user.

* * * * *